United States Patent
Kawakami et al.

[11] Patent Number: 5,991,502
[45] Date of Patent: *Nov. 23, 1999

[54] OPTICAL RECORDING DEVICE WHICH CALCULATES DISTANCES BETWEEN I-FRAMES AND RECORDS I-FRAME ADDRESSES IN A SECTOR

[75] Inventors: Shinichi Kawakami, Moriguchi; Masahiro Honjyo; Akira Muto, both of Sakai, all of Japan

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/890,608

[22] Filed: Jul. 9, 1997

Related U.S. Application Data

[63] Continuation of application No. 08/317,766, Oct. 4, 1994, abandoned.

[30] Foreign Application Priority Data

| Oct. 4, 1993 | [JP] | Japan | 5-247892 |
| Nov. 1, 1993 | [JP] | Japan | 5-273446 |
| Nov. 15, 1993 | [JP] | Japan | 5-284824 |

[51] Int. Cl.[6] .......................... H04N 5/917; H04N 7/26; H04N 5/781; H04N 5/85
[52] U.S. Cl. .......................... 386/109; 386/125; 386/68; 348/390
[58] Field of Search .................. 386/107, 6, 15, 386/27, 33, 68, 69, 79, 109, 111, 81–82, 112, 125–126; 348/384, 390

[56] References Cited

U.S. PATENT DOCUMENTS

| 4,918,523 | 4/1990 | Simon et al. . |
| 5,140,437 | 8/1992 | Yonemitsu et al. . |
| 5,168,356 | 12/1992 | Acampora et al. . |
| 5,282,208 | 1/1994 | Takayama et al. . |
| 5,371,602 | 12/1994 | Tsuboi et al. . |
| 5,377,051 | 12/1994 | Lane et al. . |
| 5,450,209 | 9/1995 | Niimura et al. . |
| 5,455,684 | 10/1995 | Fijinami et al. . |
| 5,479,264 | 12/1995 | Ueda et al. . |
| 5,485,213 | 1/1996 | Murashita et al. . |
| 5,504,585 | 4/1996 | Fujinami et al. . |
| 5,568,274 | 10/1996 | Fujinami et al. . |
| 5,666,461 | 9/1997 | Igarashi et al. . |

FOREIGN PATENT DOCUMENTS

| 2-72780 | 3/1990 | Japan . |
| 2-123883 | 5/1990 | Japan . |
| 3-66272 | 3/1991 | Japan . |
| 5-20369 | 1/1993 | Japan . |

*Primary Examiner*—Douglas W. Olms
*Assistant Examiner*—David R Vincent
*Attorney, Agent, or Firm*—Ratner & Prestia

[57] ABSTRACT

An additional information signal is recorded at a predetermined position in a series of sectors in which image data coded by an intra-frame or intra-field coding method are recorded. The additional information signal is extracted and a pickup driving circuit is controlled. Thus, only the intra-frame or intra-field coded image data sets can be reproduced. A transfer rate is recorded as the additional information, so that the image data can be stably reproduced. It is possible to predict the position of the first sector to be the next reproduced of the series of sectors in which the intra-frame coded image data are recorded, on the basis of the position of the first one of the series of sectors in which intra-frame coded image data are recorded and the position of the first one of a previous series of sectors in which the intra-frame coded image data are recorded.

9 Claims, 11 Drawing Sheets

FIG.1
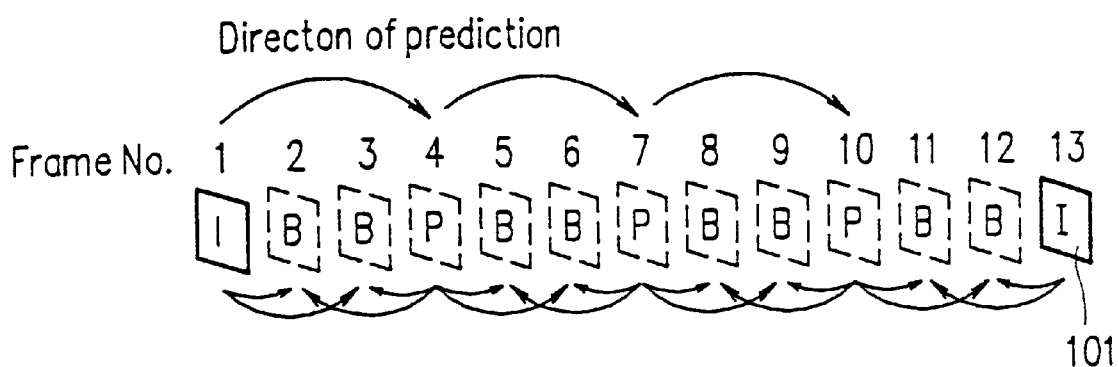
I frame
(Inter-frame coded)
B frame
(Bidirectional predictive
inter-frame coded)
P frame
(Forward predictive
inter-frame coded)

OPTICAL RECORDING DEVICE WHICH CALCULATES DISTANCES BETWEEN I-FRAMES AND RECORDS I-FRAME ADDRESSES IN A SECTOR

This application is a continuation of application Ser. No. 08/317,766, filed Oct. 4, 1994, now abandoned.

BACKGROUND OF THE INVENTION

1. Field of the Invention

The present invention relates to an optical information recording and reproducing apparatus, and a recording and reproducing method used in the apparatus. More particularly, the present invention relates to an optical information recording and reproducing apparatus for recording and reproducing a compressed and encoded video signal, and a recording and reproducing method used in the apparatus.

2. Description of the Related Art

The image data for a moving picture includes an enormous amount of information as compared with the data for a still picture, so that it is very difficult to record or reproduce the image data for a moving picture by a real-time processing. Accordingly, digitized image data is coded and compressed to a degree at which the deterioration of information is negligible with respect to the original image, and then recorded on a recording medium. Due to the data compression and coding, image data can be recorded onto the recording medium for a longer time period and image data can be reproduced from the recording medium for a longer time period.

As the coding methods for As image date, there are intra-frame (or intra-field) coding and inter-frame (or inter-field) coding. In the intra-frame (or intra-field) coding, the coding is performed within a frame (or a field). In the inter-frame (or inter-field) coding, the coding is performed between frames (or between fields). Hereinafter, the description is made for the case of frames, but it is appreciated that the same description can be made for the case of fields.

In general, some frames are included in one group. In the group, data of at least one frame is processed by intra-frame coding which has relatively low compressibility. In each group, a frame compressed by the intra-frame coding is referred to as an I frame. For the remaining frames in the group, the inter-frame coding which has relatively high compressibility is performed. By combining the intra-frame coding with the inter-frame coding, it is possible to comparatively suppress the deterioration of information, and to improve the compressibility.

The coded and compressed data is recorded onto the recording medium in the following manner. First, the data compressed by intra-frame coding (I-frame data) and the data compressed by inter-frame forward predictive coding (P) or inter-frame bidirectional predictive coding (B) are arranged along a time axis, and various codes are added, so as to constitute a unit of data. Then, the unit of data is divided into sectors each having a fixed data capacity. The sectors are provided with respective addresses, and the data is recorded onto the recording medium. When the image data which has been thus recorded onto the recording medium is to be reproduced, the reproduction is performed while recognizing the address of the sector.

However, in the case where only the intraframe coded and compressed data is to be reproduced in a trick play such as a high-speed reproduction, the above-described recording and reproducing method requires a table indicating the relationship between a sector address and data recorded in the sector. The table must be recorded in an area of the recording medium other than the area in which the coded data is recorded. For example, when image data is to be recorded onto an optical disk, sector addresses of I-frame data are recorded in a management area provided on the inner side of the optical disk (FIG. 11). The sector address cannot be written during the recording of the coded data so that it must be recorded after the recording of the coded data. This may result in a problem in that, if for some reason the table indicating the relationship cannot be written, a trick play cannot be performed.

In the cases where the image data is recorded after being coded and compressed, it is necessary to expand and decode the data for reproducing it. Therefore, it has been proposed that programing data for decoding used in the reproduction be recorded in header portions of respective data (grouped data) coded by different coding methods (for example, described in Japanese Laid-Open Patent Publication No. 2-123883). However, in such a conventional method, the information amount of the image data is not known until the compressed image data is expanded/decoded by a decoder and the codes are analyzed. Therefore, in the cases where data of different transfer rates are mixedly recorded in one recording medium, there arises a problem in that the buffer memory may cause overflow or underflow during the reproduction, or the data processing in the decoder may be delayed.

SUMMARY OF THE INVENTION

The information recording apparatus of this invention for recording video information after the video information is coded and compressed, includes: group dividing means for dividing digital image data into groups each including a plurality of frames, to generate first grouped data; coding means for coding and compressing the respective groups of the first grouped data by a first coding method and a second coding method, to generate first coded data and second coded data, respectively; sector dividing means for dividing the first and second coded data into sectors, respectively; additional information generating means for generating additional information including information identifying the first coded data and information indicating a position of the first coded data; and formatter means for combining the additional information with at least one of the divided sectors of the first coded data at a predetermined position, and for arranging the sectors of the first and second coded data in a predetermined sequence, so as to generate second grouped data.

According to another aspect of the invention, the information recording apparatus for recording video information after the video information is coded and compressed, includes: group dividing means for dividing digital image data into groups each including a plurality of frames, to generate first grouped data; coding means for coding and compressing the respective groups of the first grouped data by a first coding method and a second coding method to generate first coded data and second coded data, respectively; sector dividing means for dividing the first and second coded data into sectors, respectively; additional information generating means for generating additional information indicating a transfer rate of each of the groups of the first grouped data; and formatter means for combining the additional information with a predetermined sector of the first coded data, and for arranging the sectors of the first and second coded data in a predetermined sequence so as to generate second grouped data.

According to another aspect of the invention, the information reproducing apparatus for reproducing video information recorded on a recording medium is provided. The recorded video information is grouped data divided into a plurality of groups, each of the plurality of groups including a first coded data coded and compressed by a first coding method and second coded data, coded and compressed by a second coding method, each of the first and second coded data being divided into sectors, the sectors being arranged in a predetermined sequence in each of the groups, additional information including information identifying the first coded data and information indicating a position of the first coded data being combined with a sector of the first coded data at a predetermined position. The apparatus includes: pickup means for taking out the video information recorded onto the recording medium; pickup driving means for moving the pickup means; signal reproducing means for receiving the video information from the pickup means and for converting the video information into a reproduced signal; additional information extracting means for receiving the reproduced signal, and for extracting the additional information which is combined with the sector of the first coded data of each of the groups at the predetermined position to generate an additional information signal; control means for receiving the additional information signal and for controlling the pickup driving means based on the additional information signal; and decoder means for receiving the reproduced signal and for decoding the reproduced signal to convert the reproduced signal into an output signal.

According to another aspect of the invention, the information reproducing apparatus for reproducing video information recorded on a recording medium is provided. The recorded video information is grouped data divided into a plurality of groups, each of the plurality of groups including first coded data, coded and compressed by a first coding method, and second coded data, coded and compressed by a second coding method, each of the first and second coded data being divided into sectors, the sectors being arranged in a predetermined sequence in each of the groups. The apparatus includes: pickup means for taking out the video information recorded on the recording medium; pickup driving means for moving the pickup means; signal reproducing means for receiving the video information from the pickup means and for converting the video information into a reproduced signal; address storage means for receiving the reproduced signal and for storing addresses of the sectors of the first coded data in each of the groups; position predicting means for receiving the stored addresses from the address storage means and for predicting an address of a first sector of a series of sectors in which the first coded data are recorded in each of the groups; control means for receiving the predicted result of the position predicting means and for controlling the pickup driving means based on the predicted result; and decoder means for receiving the reproduced signal and for decoding the reproduced signal to convert the reproduced signal into an output signal.

According to another aspect of the invention, a method for recording video information after the video information is coded and compressed is provided. The method includes: (a) a step of dividing digital image data into groups, each including a plurality of frames, to generate first grouped data; (b) a step of coding and compressing the respective groups of the first grouped data by a first coding method to generate first coded data; (c) a stop of coding and compressing the respective groups of the first grouped data by a second coding method, to generate second coded data; (d) a step of dividing the first and second coded data into sectors, respectively; (e) a step of generating additional information including information identifying the first coded data and information indicating a position of the first coded data; (f) a step of combining the additional information with at least one of the divided sectors of the first coded data at a predetermined position; and (g) a step of arranging the sectors of the first and second coded data in a predetermined sequence so as to generate second grouped data.

According to another aspect of the invention, an information recording method for recording video information after the video information is coded and compressed is provided. The method includes: (a) a stop of dividing digital image data into groups, each including a plurality of frames, to generate first grouped data; (b) a step of coding and compressing the respective groups of the first grouped data by a first coding method to generate first coded data; (c) a step of coding and compressing the respective groups of the first grouped data by a second coding method to generate second coded data; (d) a step of dividing the first and second coded data into sectors, respectively; (e) a step of generating additional information indicating a transfer rate of each of the groups of the first grouped data; (f) a stop of combining the additional information with a predetermined sector of the first coded data; and (g) a step of arranging the sectors of the first and second coded data in a predetermined sequence so as to generate second grouped data.

According to another aspect of the invention, a method for reproducing video information recorded on a recording medium is provided. The recorded video information is grouped data divided into a plurality of groups, each of the plurality of groups including first coded data, coded and compressed by a first coding method, and second coded data, coded and compressed by a second coding method, each of the first and second coded data being divided into sectors, the sectors being arranged in a predetermined sequence in each of the groups, additional information including information identifying the first coded data and information indicating a position of the first coded data being combined with a sector of the first coded data at a predetermined position. The method includes: (a) a step of taking out the video information recorded on the recording medium by pickup means; (b) a step of converting the video information into a reproduced signal; (c) a step of extracting, from the reproduced signal, the additional information which is combined with the sector of the first coded data of each of the groups at the predetermined position to generate an additional information signal; (d) a step of controlling the pickup means based on the additional information signal to move the pickup means to a predetermined position at which the first coded data is recorded; and (e) a step of decoding the reproduced signal to convert the reproduced signal into an output signal.

According to another aspect of the invention, a method for reproducing video Information recorded on a recording medium is provided. The recorded video information is grouped data divided into a plurality of groups, each of the plurality of groups including first coded data, coded and compressed by a first coding method, and second coded data, coded and compressed by a second coding method, each of the first and second coded data being divided into sectors, the sectors being arranged in a predetermined sequence in each of the groups. The method includes: (a) a stop of taking out the video information recorded on the recording medium by pickup means; (b) a step of converting the video information into a reproduced signal; (c) a step of extracting, from the reproduced signal, addresses of sectors of the first coded data in each of the groups of the video information, and storing the extracted addresses; (d) a step of predicting an address of a first sector of a series of sectors in which the first coded data are recorded in each of the groups, based on the stored addresses; (e) a step of controlling the pickup means based on the predicted result to move the pickup means into a position at which the first coded data is recorded; and (f) a step of decoding the reproduced signal to convert the reproduced signal into an output signal.

Thus, the invention described herein makes possible the advantages of (1) providing an optical information recording and reproducing apparatus and a recording and reproducing method used in the apparatus, in which trick plays such as high-speed forward reproduction and high-speed backward reproduction can be performed by selectively reproducing data which can be decoded by relatively simple procedures such as intra-frame (or intra-field) coded data among the coded image data, (2) providing an optical information recording and reproducing apparatus and a recording and reproducing method used in the apparatus, in which a selection method of data to be reproduced can be changed in accordance with a desired reproduction speed in the trick play, and (3) providing an optical information recording and reproducing apparatus and a recording and reproducing method used in the apparatus, in which image data can be stably and smoothly decoded even when data of different transfer rates are mixedly recorded on one recording medium.

These and other advantages of the present invention will become apparent to those skilled in the art upon reading and understanding the following detailed description with reference to the accompanying figures.

BRIEF DESCRIPTION OF THE DRAWINGS

FIG. 1 is a diagram showing image data coded by a coding method under MPEG standard.

DESCRIPTION OF THE PREFERRED EMBODIMENTS

Hereinafter, the present invention will be described by way of illustrative examples with reference to the accompanying drawings.

In the following description, image data signals for a moving picture are digital video signals which are input by a unit of frame or a unit of field, and they are compressed by at least two types of coding methods. For example, the two types are intra-frame (intra-field) coding for spatial information compression and inter-frame (inter-field) coding for information compression along a time axis. Typical image data signals are those coded by a coding method under MPEG (Moving Picture Image Coding Experts Group) standard (FIG. 1). As shown in FIG. 1, in the coded image data, an I (Intra-Coded) frame coded by intra-frame coding, a P (Predictive Coded) frame coded by forward predictive coding, and a B (Bidirectionally Predictive Coded) frame coded by bidirectional predictive coding are arranged in a predetermined sequence. If the coding is performed by the unit of field instead of the unit of frame, an I field, a P field, and a B field are arranged. Hereinafter, the description is made in the case of the frame unit, but it is appreciated that the same description can be made for the case of field unit.

EXAMPLE 1

Figure 2:
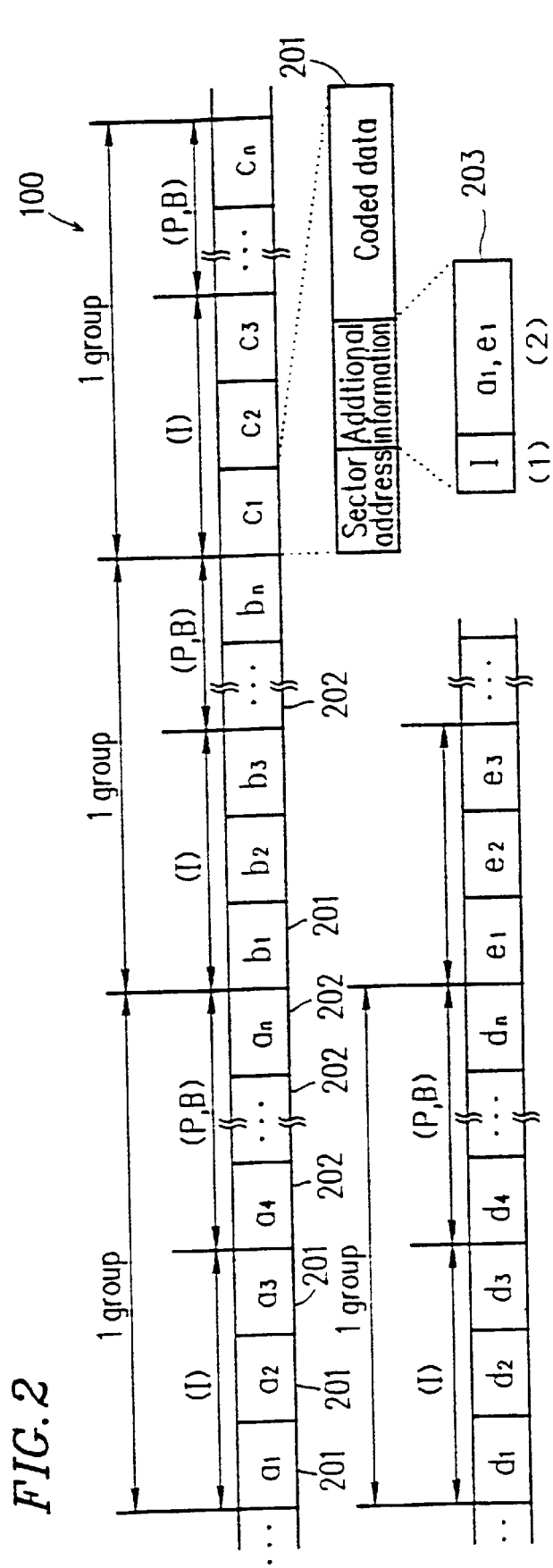
FIG. 2 is a diagram showing a sector arrangement of image data recorded on a recording medium and the contents of additional information according to a first example of the invention.

FIG. 2 schematically shows the sequence of image data 100 recorded on a recording medium according to a first example of the invention. The digital image data coded and compressed by the above-described methods are recorded in groups. For example, the recording medium is an optical disk, or the like. One group includes one I-frame data, and corresponding P-frame and B-frame data. The corresponding P-frame and B-frame data indicates the data of P-frames and B-frames located between the I frame and the next I frame. The data of I, P, and B frames ere respectively divided into sectors and then recorded. In FIG. 2, each group includes n sectors (e.g., sectors $a_1$ to $a_n$). I-frame data is located in sectors 201 at the beginning of each group (e.g., sectors $a_1$–$a_3$). P- and B-frame data is located in the remaining sectors 202 (e.g., sectors $a_4$–$a_n$). Each sector for the I-frame date includes its sector address, additional information 203, and coded data.

One or more additional information areas may be provided. The additional information 203 can be located in every sector for the I frame as described above. Alternatively, the additional information 203 may be located only in the first sector for the I frame or located only in the first and last sectors for the I frame.

The additional information 203 includes the following elements:
(1) an identifier indicating that the data recorded in the sector is intra-frame coded data; and
(2) an address of the first sector for the I frame in a group preceding by m groups with respect to the group to which the sector belongs, and/or an address of the first sector for the I frame in a group succeeding by m groups with respect to the group to which the sector belongs.

For example, as shown in FIG. 2, additional information 203 is recorded at a predetermined position in the sector $c_1$ for I-frame data in one group. The additional information 203 includes an identifier I, an address (indicated by $a_1$ identical with the sector name) of the first sector $a_1$ for I frame in a group preceding by m groups (in the figure, m=2), and an address ($e_1$) of the first sector $e_1$ for I frame in a group succeeding by m groups.

The recorded order of elements (1) and (2) can be reversed.

The additional information 203 can include the following element instead of element (2):
(3) a distance to the first sector for the I frame in a group preceding by m groups with respect to the group to which the sector belongs, and/or a distance to the first sector for the I frame in a group succeeding by m groups with respect to the group to which the sector belongs.

The distance may be a difference between the address of the sector and the address of the first sector for the I frame in a group preceding by m groups with respect to a group which includes the sector, or a difference between the address of the sector and the address of the first sector for the I frame in a group succeeding by m groups with respect to a group which includes the sector.

Figure 3:
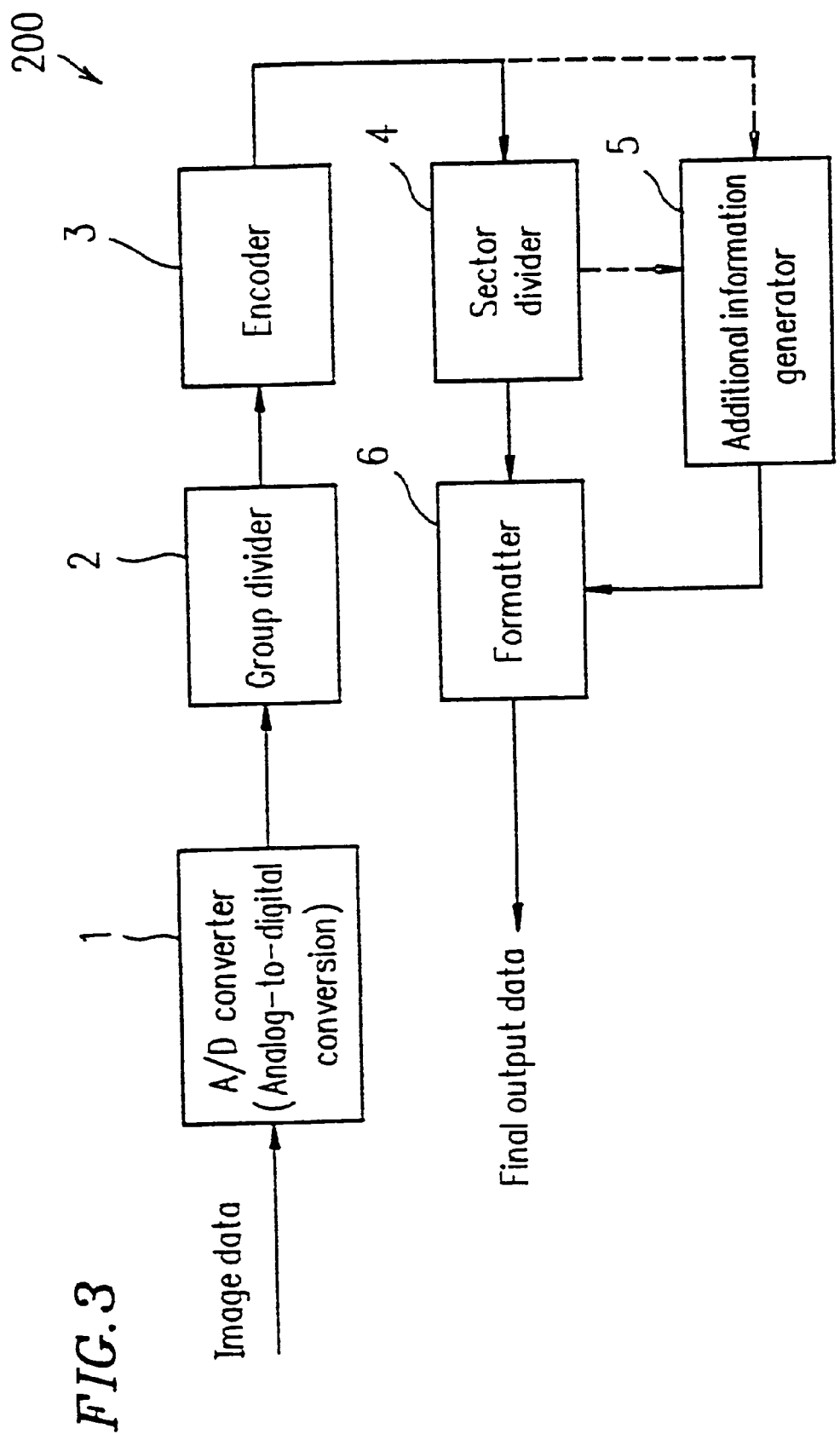
FIG. 3 is a block diagram showing an information recording apparatus according to the first example of the invention.

FIG. 3 is a block diagram showing a recording apparatus 200 according to the invention for recording the above-described image data. The recording apparatus 200 includes an analog/digital converter 1, a group divider 2 for dividing digital image data into groups each including a plurality of frames, an encoder 3, a sector divider 4 for dividing the coded image data into sectors, an additional information generator 5 for generating the above-described additional information, and a formatter 6 for producing output data by combining the additional information with a predetermined sector and arranging the respective sectors.

The group divider 2 divides the input image data (serial data) into groups including a plurality of frames, so as to produce first grouped data. The encoder 3 performs the coding and compression for each group of the first grouped data. By using the intra-frame coding method, an I frame (first coded data) is generated. By using the forward and bidirectional predictive coding methods, P and B frames (second coded data) are generated. In some cases, either one of the forward predictive coding and the bidirectional predictive coding may be used. The sector divider 4 divides the I, P, and B frames into a predetermined number of sectors which are output to the formatter 6. The additional information generator 5 generates an identifier I indicative of the I frame, and additional information indicating positions of I frames in a group which precedes and/or succeeds by m groups or a relative distance between a specific I frame of a group and an I-frame in a group which precedes and/or succeeds by m groups with respect to the specific I frame. The generated additional information is supplied to the formatter 6. The formatter 6 combines the additional information with at least one of the sectors for I-frame data at a predetermined position, and arranges the sectors of the I, P, and B frame data in a predetermined sequence. As a result, the formatter 6 generates grouped data 100 to be recorded.

Herein, the additional information on the relative distance between I frames belonging to different groups (one group includes one I-frame data, and corresponding P-frame and B-frame data) may, for example, be differences between the addresses of the first and the last sectors for I-frame data in a specific group and the address of the first sector for the I-frame data in a group preceding by m groups with respect to the specific group, or differences between the addresses of the first and the last sectors for the I-frame data in a specific group and the address of the first sector for the I-frame data in a group succeeding by m groups with respect to the specific group. Any combinations of such differences can be used as the information as required. The number m of skipped groups (m is a natural number) can be selected in accordance with the speed of a trick play (the high-speed reproduction). If information related to a plurality of values for m is recorded, it is possible to accommodate various speeds in high-speed reproduction.

EXAMPLE 2

Figure 4:
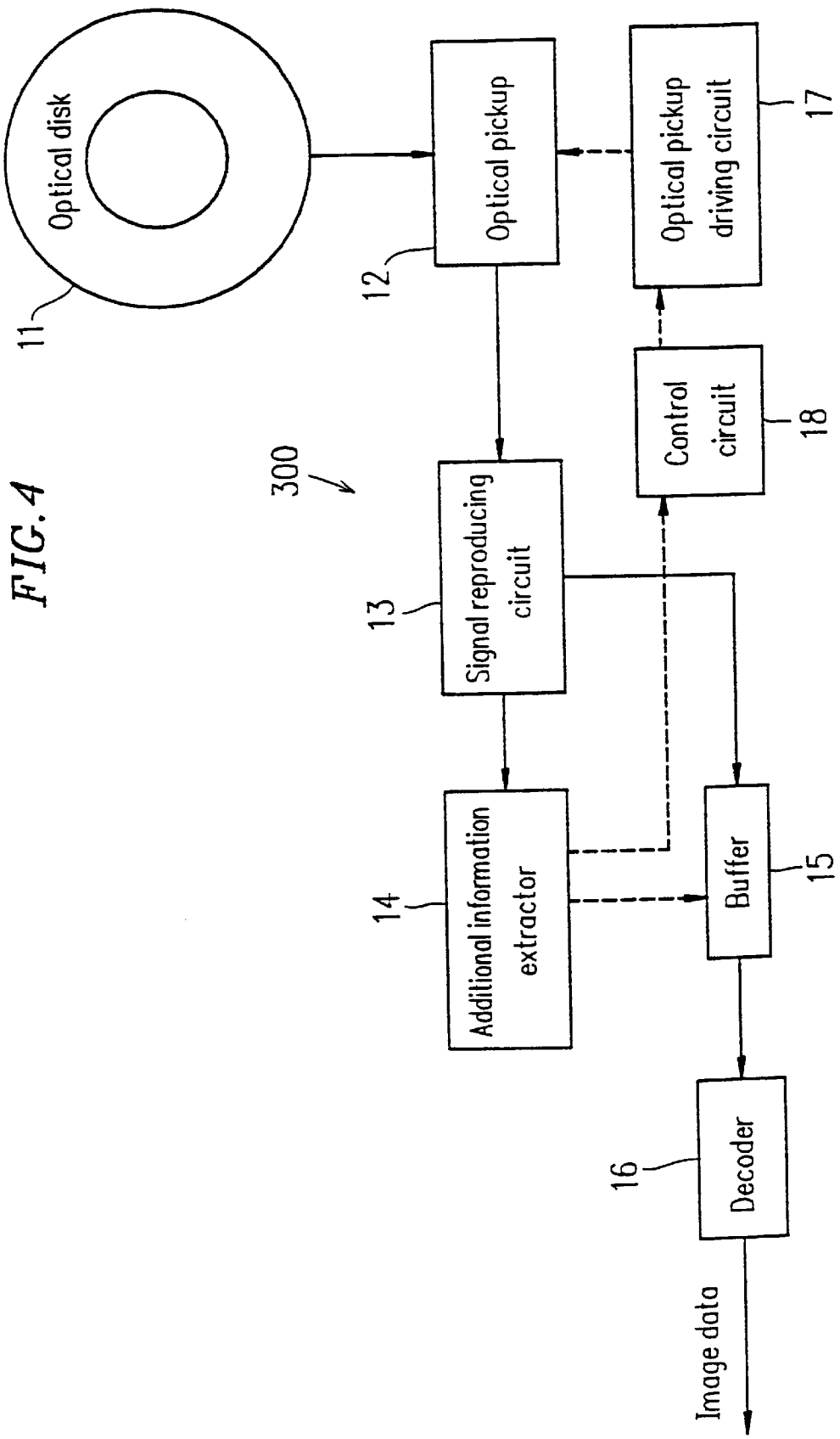
FIG. 4 is a block diagram showing an information reproducing apparatus according to a second example of the invention.

FIG. 4 is a block diagram schematically showing an information reproducing apparatus 300 according to a second example of the invention. The information reproducing apparatus 300 reproduces video information (image data) which has been coded and compressed and recorded on a recording medium such as an optical disk by a recording apparatus such as the above-described information recording apparatus 200. In the following description, an optical disk is used for the recording medium. It is appreciated that any other types of recording media (e.g., a magnetic recording medium) can be used. This example describes the reproducing apparatus 300 in the case where the additional information includes elements (1) and (2) described in Example 1.

The information reproducing apparatus 300 includes an optical pickup device 12 for taking out the video information recorded on a recording medium 11, an optical pickup driving circuit 17 for moving the optical pickup device 12, a signal reproducing circuit 13 for receiving the video information from the optical pickup device 12 and for converting the video signal into a reproduced signal, an additional information extractor 14 for extracting an additional information signal of a sector for the I-frame data in each group from the reproduced signal, a buffer 15, a decoder 16 for decoding the reproduced signal 80 as to convert the reproduced signal into an output signal, and a control circuit 18 for controlling the optical pickup driving circuit 17 based on the additional information signal.

The signal reproducing circuit 13 receives the image data signal from the optical pickup device 12, and performs digitization, digital demodulation, error correction, and the like. The image data output from the signal reproducing circuit 13 is fed into the additional information extractor 14 and the buffer 15. The additional information extractor 14 extracts the additional information which has been described in Example 1 and the additional information signal is output to the buffer 15 and the control circuit 18. The control circuit 18 controls the optical pickup driving circuit 17 based on the additional information signal. In FIG. 4, the control circuit 18 is separately provided. Alternatively, the control circuit 18 may be provided in the optical pickup driving circuit 17. The decoder 16 receives the output of the buffer 15, and performs data expansion and decoding for the image data which has been coded and compressed. Thus, image data that is to be displayed is output.

In a trick play such as a high-speed reproduction, only the I-frame data sets are successively reproduced in the following manner. By using additional information in one group extracted by the additional information extractor 14, it is possible to obtain, for example, the address of the first sector for the I-frame data to be reproduced next (i.e., the first sector for the I-frame data belonging to a group separated by m groups). The control circuit 18 controls the optical pickup driving circuit 17, so that the optical pickup device 12 (specifically, a reproduction head of the optical pickup device 12: not shown) is track-jumped to the obtained address. As the result of this track-jump, the reproduction head reaches the first sector for the I-frame data to be reproduced next, and the image information is reproduced from the sector for the I-frame data. Since the I-frame data includes the address information of the first sector for the I-frame data to be reproduced next, the reproduction head is track-jumped to the next address. By repeatedly performing the above operation, only the I-frame data sets can be successively reproduced.

The address of the first sector can be appropriately selected in accordance with the speed of the desired high-speed reproduction. In the case where the trick play is performed at a very high speed, it is sufficient to set the number m of groups to be track-jumped larger. Moreover, if sector address information corresponding to various values of m is recorded, it is possible to set a plurality of trick-play modes for different reproducing speeds.

A trick play can be performed by using additional information only including the identifier I which indicates that the sector is the I-frame data. However, in such a case, the I frames in all groups are reproduced, so that the speed for the trick play is limited.

In order to efficiently utilize the recording medium, compressibility of image data may be varied in accordance with the type of image data to be recorded and reproduced (for example, video image data for drama and sports programs that include active motion, and video image data for news programs that include less motion). In such a case, by recording the sector address for the I-frame data to be reproduced next, it is possible to perform an effective trick play in accordance with the compressibility.

EXAMPLE 3

Figure 5:
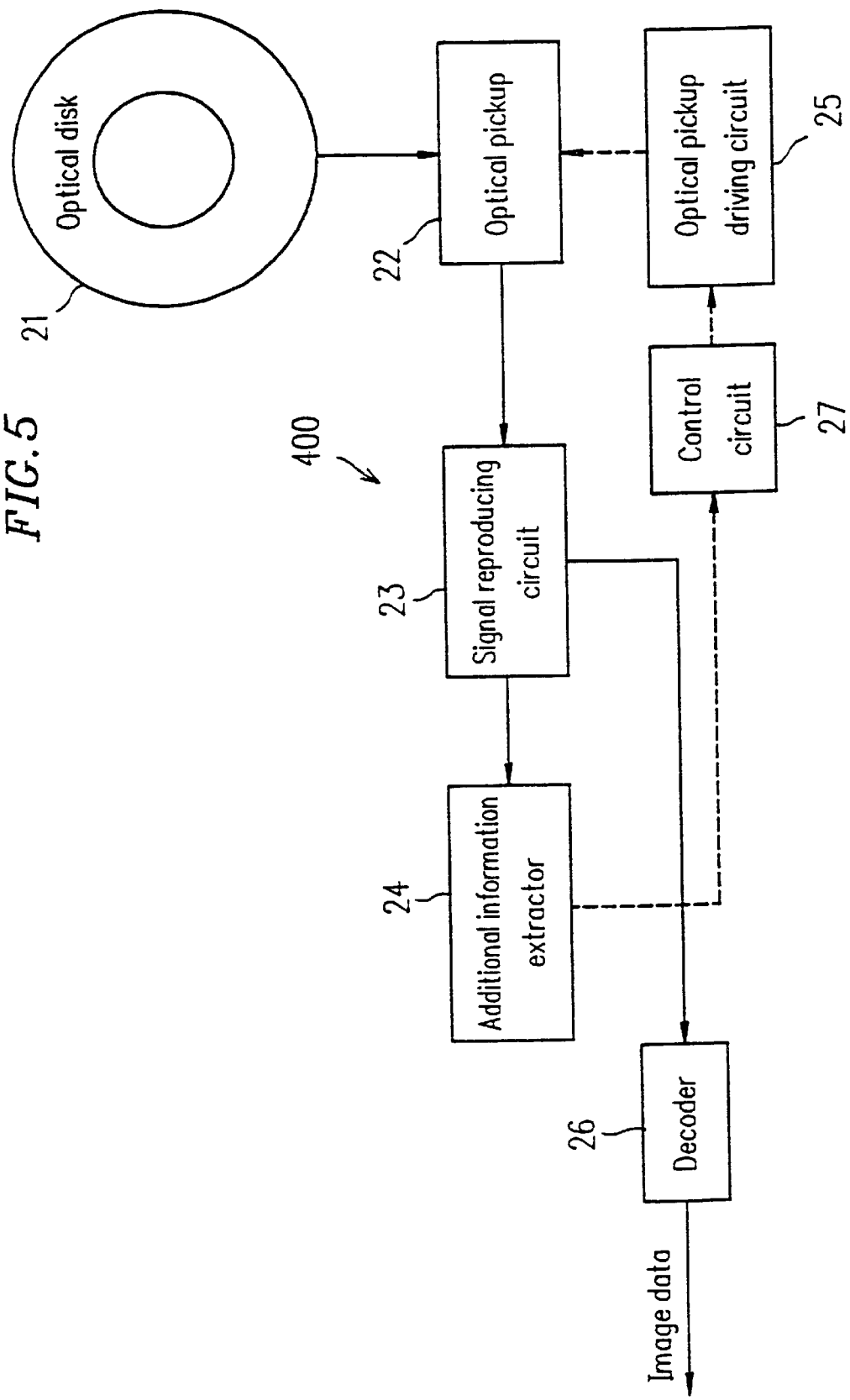
FIG. 5 is a block diagram showing an information reproducing apparatus according to a third example of the invention.

FIG. 5 is a block diagram schematically showing an information reproducing apparatus 400 according to a third example of the invention. The information reproducing apparatus 400 reproduces video information (image data) which has been coded and compressed, and recorded on a recording medium such as an optical disk by a recording apparatus such as the above-described information recording apparatus 200. In the following description, an optical disk is used for the recording medium. It is appreciated that any other types of recording media (e.g., a magnetic recording medium) can be used. This example describes the reproducing apparatus 400 in the case where the additional information includes elements (1) and (3) described in Example 1.

The information reproducing apparatus 400 includes an optical pickup device 22 for taking out the video information recorded onto a recording medium 21, an optical pickup driving circuit 25 for moving the optical pickup device 22, a signal reproducing circuit 23 for receiving the video information from the optical pickup device 22 and for converting the video signal into a reproduced signal, an additional information extractor 24 for extracting an additional information signal of a sector for the I-frame data in each group from the reproduced signal, a decoder 26 for decoding the reproduced signal so as to convert the reproduced signal into an output signal, and a control circuit 27 for controlling the optical pickup driving circuit 25 based on the additional information signal.

The signal reproducing circuit 23 receives the image data signal from the optical pickup device 22, and performs digitization, digital demodulation, error correction, and the like. The image data output from the signal reproducing circuit 23 is fed into the additional information extractor 24. The additional information extractor 24 extracts the additional information (distance information) which has been described in Example 1 and the additional information signal is output to the control circuit 27. The control circuit 27 controls the optical pickup driving circuit 25 based on the additional information signal. In FIG. 5, the control circuit 27 is separately provided. Alternatively, the control circuit 27 may be provided in the optical pickup driving circuit 25. The decoder 26 receives the output of the signal reproducing circuit 23, and performs data expansion and decoding for the image data which has been coded and compressed. Thus, image data to be displayed is output.

In a trick play such as a high-speed reproduction, only the I-frame data sets are successively reproduced in the following manner. From the additional information recorded at a predetermined position of a sector for the I-frame data in a specific group, the additional information extractor 24 extracts distance information from the sector to an I frame in a group succeeding by m groups with respect to the specific group. By using the distance information, it is possible to obtain a distance of track-jump for the reproduction head so as to reach the I frame that is to be reproduced next. The distance may, for example, be a difference between an address of the first or last sector of one I frame and the first address of an I frame to be reproduced next. The control circuit 27 controls the optical pickup driving circuit 25, so that the optical pickup device 22 (specifically, the reproduction head of the optical pickup device 22: not shown) is track-jumped by the obtained distance. As a result of this track-jump, the reproduction head reaches the first sector for the I-frame data to be reproduced next, and the image information is reproduced from the sector for the I-frame data. Since the I-frame data includes the distance information to the I-frame data to be reproduced next, the reproduction head is track-jumped to the next I-frame data. By repeatedly performing the above operation, only the I-frame data sets can be successively reproduced. It is appreciated that the distance to be track-jumped may be somewhat shorter than the distance included in the distance information extracted by the additional information extractor 24. This can prevent an excessive jump of the reproduction head.

The distance to be track-jumped can be appropriately selected in accordance with the speed of the desired trick play. In the case where the trick play is performed at a very high speed, it is sufficient to set the distance so that several groups are jumped. Moreover, if a plurality of distance information sets are recorded, it is possible to set a plurality of trick-play modes. As in Example 2, it is possible to perform an effective trick play in accordance with the type and the compressibility of the image data.

In addition, since the distance is used as the additional information, it is possible to directly control the optical pickup driving circuit without calculating any address.

EXAMPLE 4

Figure 6:
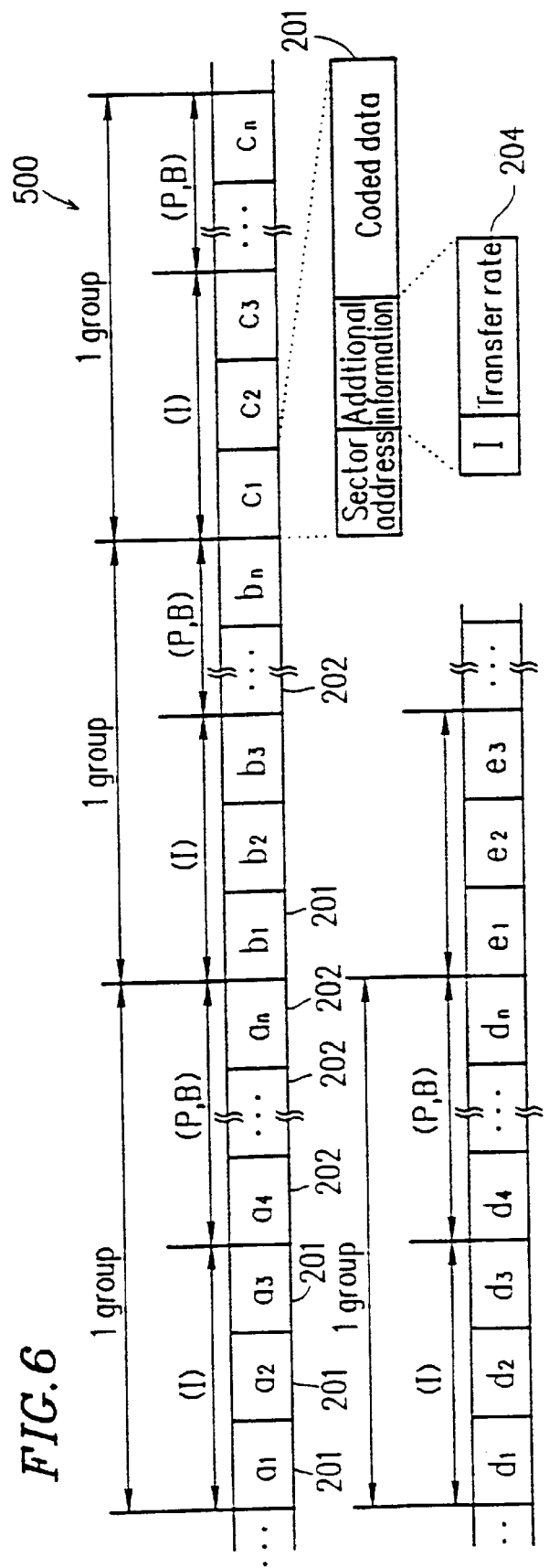
FIG. 6 is a diagram showing a sector arrangement of image data recorded on a recording medium and the contents of additional information according to a fourth example of the invention.

FIG. 6 schematically shows the sequence of image data 500 recorded on a recording medium according to a fourth example of the invention. The structure of the image data 500 is identical with that of the image data 100 described in Example 1, except for the contents of additional information 204. In Example 1, the additional information 203 includes (1) the identifier I indicating that the data recorded in the sector is intra-frame coded data (I-frame), and (2) an address of the I frame to be reproduced next, or (3) the distance to an I frame to be reproduced next.

In this example, as is seen from FIG. 6, the additional information 204 includes (4) a transfer rate of image data in each group, instead of element (2) or (3). The additional information 204 also includes the identifier I (1) similar to the additional information 203. The additional information 204 is recorded in each sector for the I-frame. Alternatively, the additional information 204 may be recorded only in the first sector for the I-frame.

In this example, the transfer rate in the additional information indicates the transfer rate of the group which includes the additional information. Alternatively, the transfer rate may be a transfer rate obtained by averaging transfer rates of a plurality of groups. One or more sets of additional information can be recorded. The recorded order of elements (1) and (4) can be reversed.

The image data 500 can be recorded in the same way as described in Example 1, in such a manner that the additional information generator 5 generates the additional information 204 instead of the additional information 203 in the recording apparatus 200 shown in FIG. 3 (the detailed description for the image data 500 is omitted).

Figure 7:
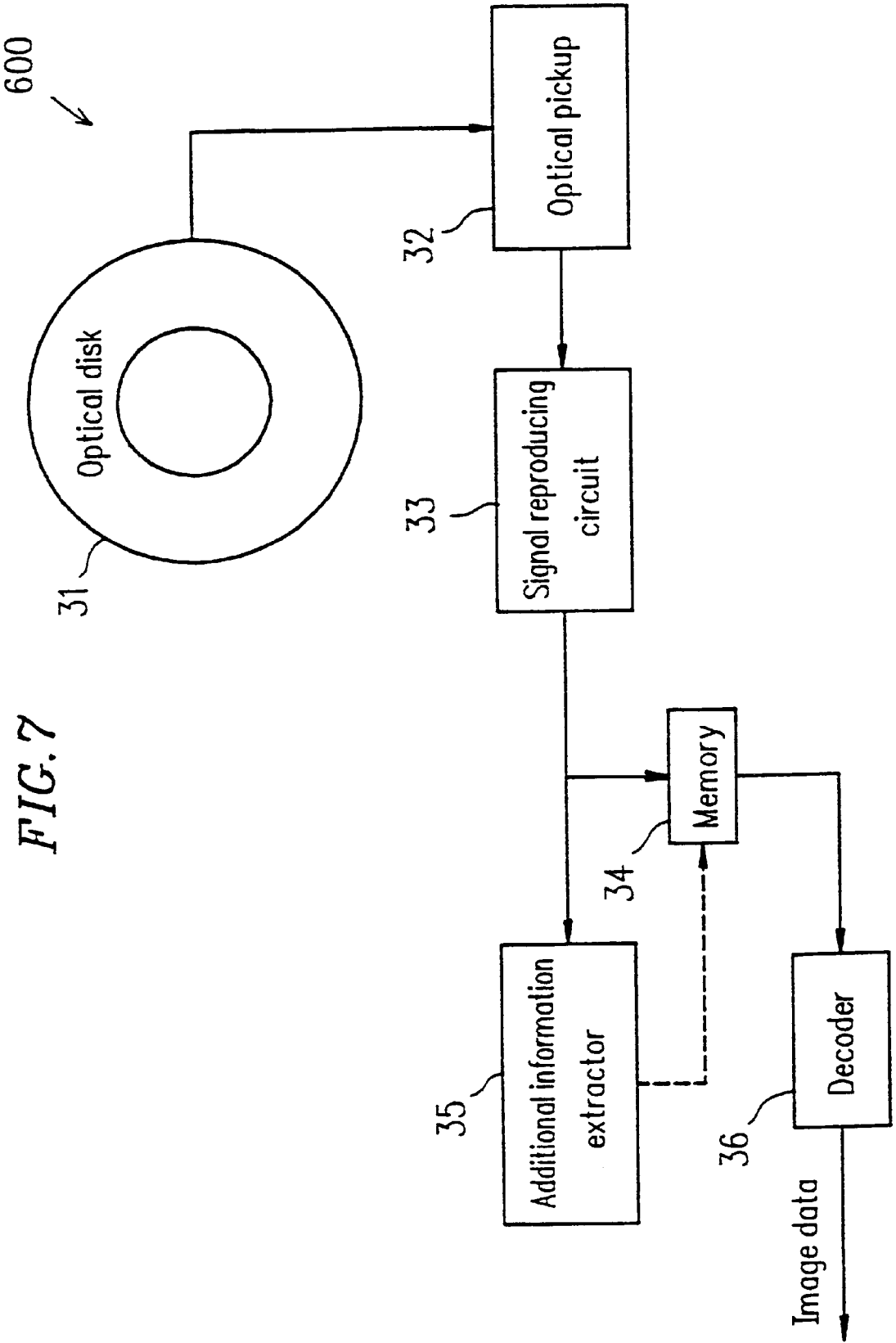
FIG. 7 is a block diagram showing an information reproducing apparatus according to the fourth example of the invention.

FIG. 7 is a block diagram schematically showing an information reproducing apparatus 600 according to the fourth example of the invention. The information reproducing apparatus 600 reproduces the image data 500 recorded on a recording medium such as an optical disk.

The information reproducing apparatus 600 includes an optical pickup device 32 for taking out the video information recorded onto a recording medium 31, a signal reproducing circuit 33 for receiving the video information from the optical pickup device 32 and for converting the video signal into a reproduced signal, an additional information extractor 35 for extracting an additional information signal of a sector for the I-frame data in each group from the reproduced signal, a memory 34, and a decoder 36 for decoding the reproduced signal so as to convert the reproduced signal into an output signal.

The signal reproducing circuit 33 receives the image data signal from the optical pickup device 32, and performs digitization, digital demodulation, error correction, and the like. The image data output from the signal reproducing circuit 33 is fed into the additional information extractor 35 and the memory 34. The additional information extractor 35 extracts the above-described additional information (transfer rate) and the additional information signal is output to the memory 34. The input and the output of the memory 34 are controlled in accordance with the transfer rate based on the additional information signal. The decoder 36 receives the output of the memory 34, and performs data expansion and decoding for the image data which has been coded and compressed. Thus, image data to be displayed is output.

The reproducing apparatus 600 of this example can be also provided with an optical pickup driving circuit for moving the optical pickup device 32. In such a case, the reproducing apparatus 600 can be combined with the previous examples.

The additional information may be the amount of information included in the group, instead of the transfer rate.

By using the transfer rate as the additional information, it is possible to stably and smoothly decode the image data even when data with different transfer rates are mixedly recorded on one recording medium.

EXAMPLE 5

This example describes a reproducing apparatus and a reproducing method in which a distance from an I-frame data of one group to an I frame of a group separated by m groups is predicted so that only the I-frame data sets are successively reproduced in a trick play.

Figure 8:
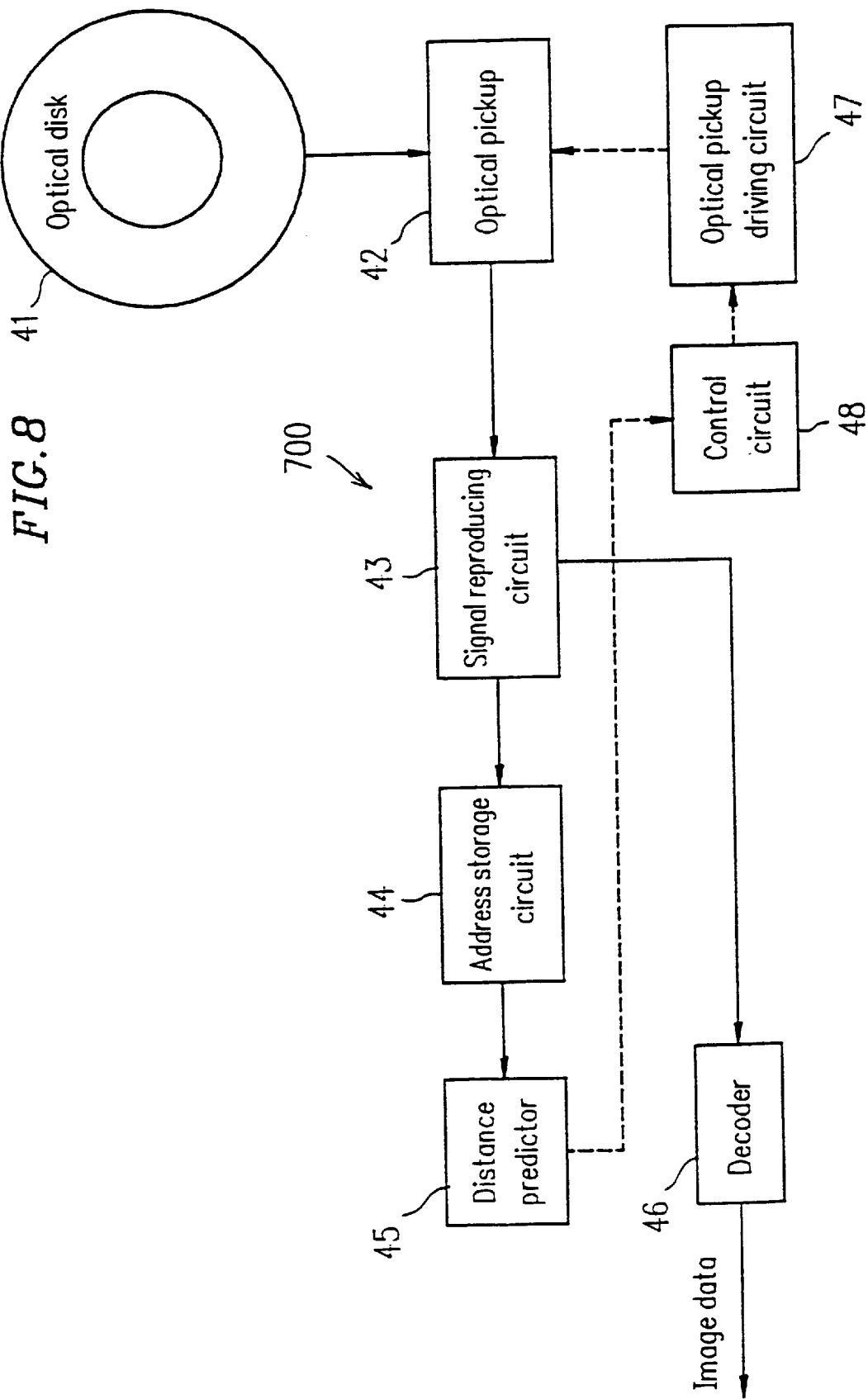
FIG. 8 is a block diagram showing an information reproducing apparatus according to a fifth example of the invention.

FIG. 8 is a block diagram schematically showing an information reproducing apparatus 700 according to a fifth example of the invention. The information reproducing apparatus 700 reproduces video information (image data 800 shown in FIG. 10) which has been coded and compressed and recorded on a recording medium such as an optical disk. In the following description, an optical disk is used for the recording medium. It is appreciated that any other type of recording media (e.g., a magnetic recording medium) can also be used.

The information reproducing apparatus 700 includes an optical pickup device 42 for taking out the video information recorded on a recording medium 41, an optical pickup driving circuit 47 for moving the optical pickup device 42, a signal reproducing circuit 43 for receiving the video information from the optical pickup device 42 and for converting the video signal into a reproduced signal, an address storage circuit 44, a distance predictor 45, a decoder 46 for decoding the reproduced signal so as to convert the reproduced signal into an output signal, and a control circuit 48 for controlling the optical pickup driving circuit 47 based on a distance information signal output from the distance predictor 45.

The signal reproducing circuit 43 receives the image data signal from the optical pickup device 42, and performs digitization, digital demodulation, error correction, and the like. The image data output from the signal reproducing circuit 43 is fed into the address storage circuit 44 and the decoder 46. The address storage circuit 44 stores addresses of a series of sectors for the I-frame data. The address stored in the address storage circuit 44 is output as address information, and supplied to the distance predictor 45. The distance predictor 45 predicts the distance to an I frame in the group to be reproduced next based on the address information. The predicted distance is supplied to the control circuit 48 as a distance information signal. The control circuit 48 controls the optical pickup driving circuit 47 based on the distance information signal. In FIG. 8, the control circuit 48 is separately provided. Alternatively, the control circuit 48 may be provided in the optical pickup driving circuit 47. The decoder 46 receives the output of the signal reproducing circuit 43, and performs data expansion and decoding for the image data which has been coded and compressed. Thus, image data to be displayed is output.

In a trick play such as a high-speed reproduction, only the I-frame data sets are successively reproduced in the following manner.

Figure 9:
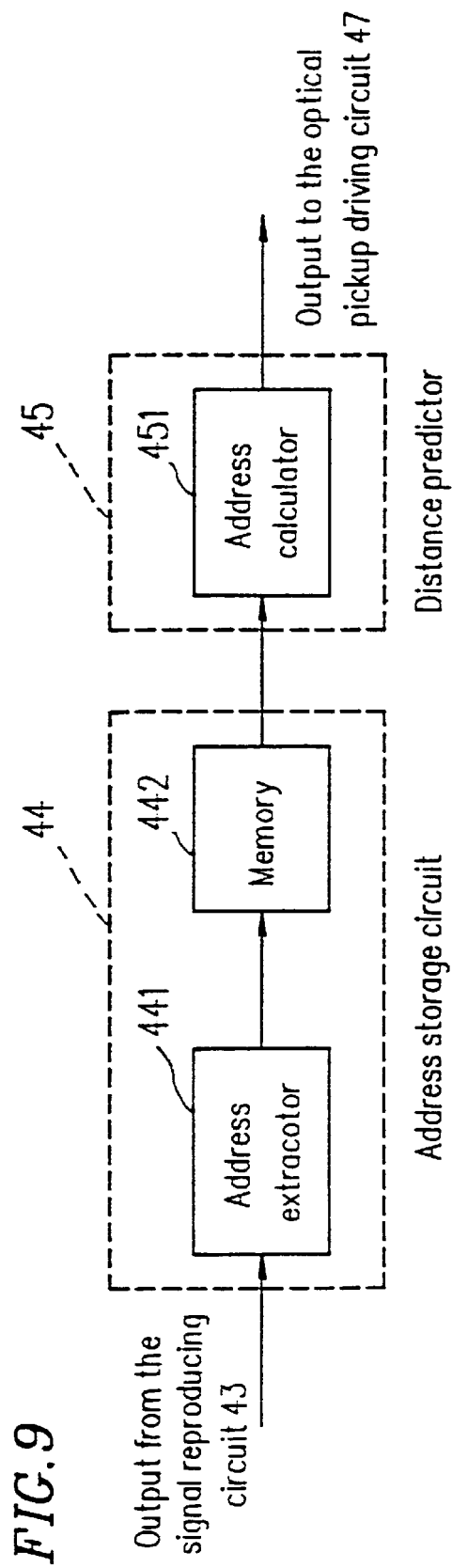
FIG. 9 is a diagram showing the address storage circuit and the distance predictor shown in FIG. 8 in more detail.

As shown in FIG. 9, the address storage circuit 44 includes an address extractor 441 and a memory 442, and the distance predictor 45 includes an address calculator 451.

The address extractor 441 extracts addresses of sectors for the I-frame data in each group from the image data applied from the signal reproducing circuit 43. The extracted addresses are stored in the memory 442, and addresses to be used are fed into the address calculator 451.

Figure 10:
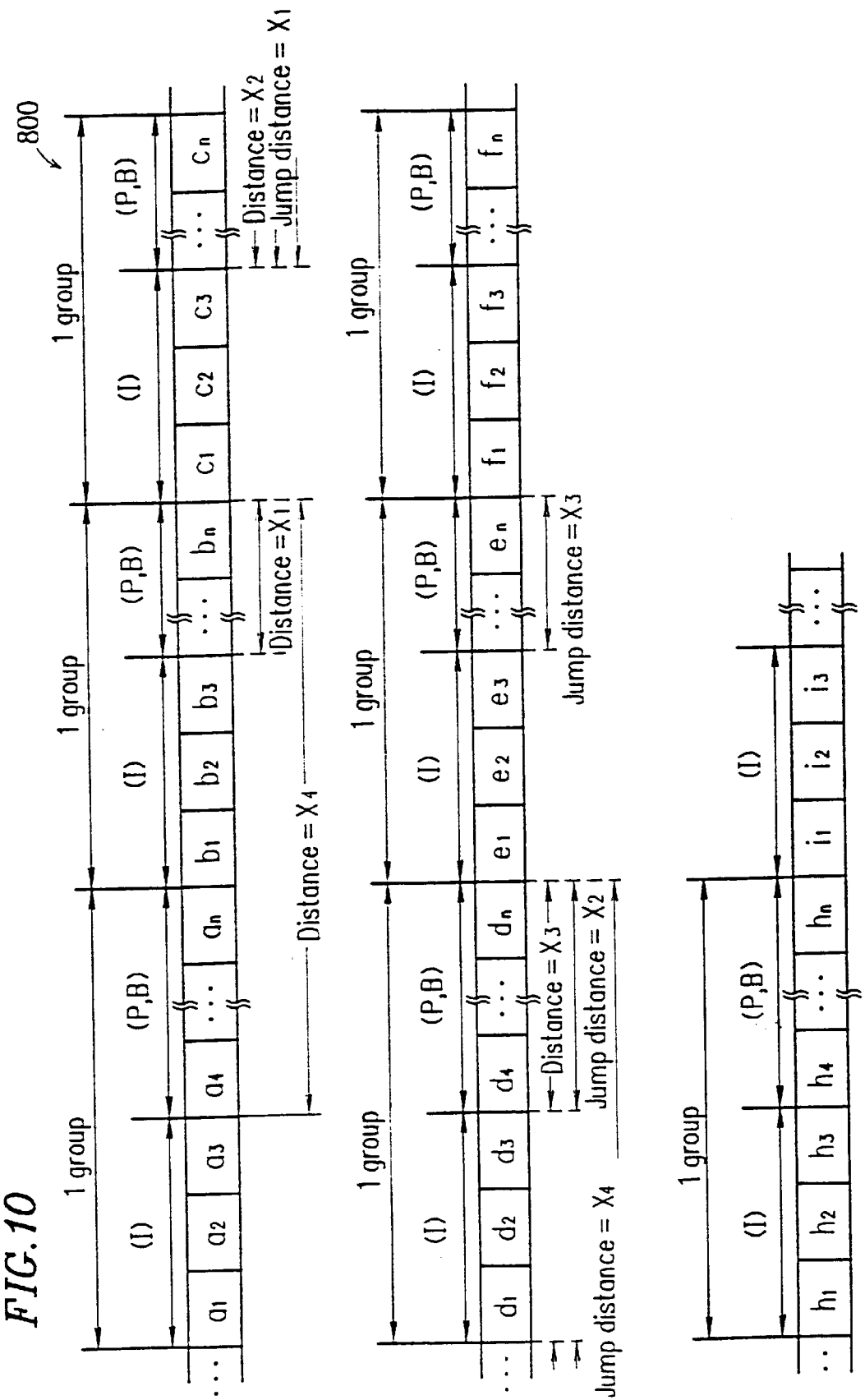
FIG. 10 is a diagram showing a sector arrangement of image data and distances between sectors in the image data used in the fifth example of the invention.
Figure 11:
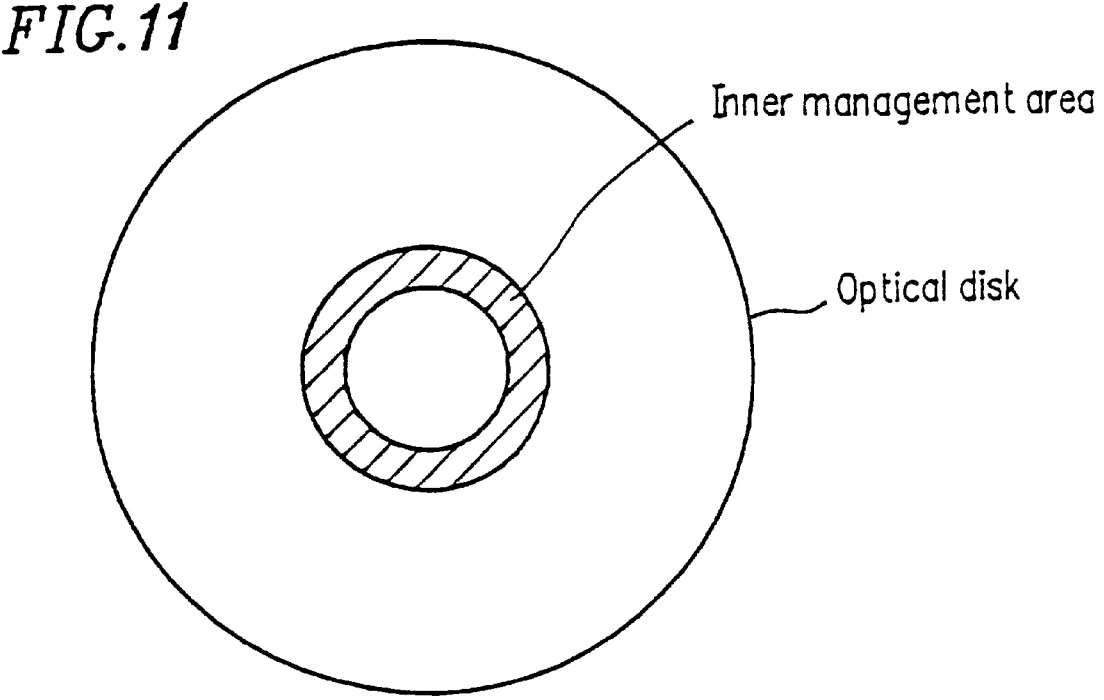
FIG. 11 is a diagram showing a conventional method for recording a sector address of I-frame data.

For example, as shown in FIGS. 9 and 10, the address of the first sector $c_1$ for the I-frame in one group (c) and the address of the last sector $b_3$ for the I-frame in group (b) which immediately precedes group (c) are stored in the address storage circuit 44 (specifically, in the memory 442). The address storage circuit 44 outputs the stored addresses to the distance predictor 45.

The distance predictor 45 calculates a distance $x_1$ from the sector $c_1$ to the sector $b_3$ using the address information supplied from the address storage circuit 44. After the I-frame data recorded in the sectors $c_1$–$c_3$ in the group (c) are reproduced, the distance predictor 45 predicts the distance to the first address for the I-frame to be reproduced next by using the distance $x_1$, and the distance information signal is supplied to the control circuit 48. The control circuit 48 controls the optical pickup driving circuit 47, so that the optical pickup device 42 (specifically, the reproduction head of the optical pickup device 42: not shown) is track-jumped by the predicted distance. As the result of this track-jump, the reproduction head is jumped to the first sector $d_1$ for the I-frame in the next group (d), and the I-frame data in the sectors $d_1$–$d_3$ are reproduced.

Next, the address storage circuit 44 stores the address of the sector $d_1$ and the address of the sector $c_3$ which was reproduced immediately before, and the stored addresses are output to the distance predictor 45. The distance predictor 45 predicts the distance $x_2$ from the sector $d_1$ to the sector $c_3$ using the address information supplied from the address storage circuit 44. After the I-frame data recorded in the sectors $d_1$–$d_3$ in the group (d) are reproduced, the distance predictor 45 predicts the distance to the first address for the I-frame to be reproduced next by using the distance $x_2$, and the distance information signal is supplied to the control circuit 48. The control circuit 48 controls the optical pickup driving circuit 47, so that the reproduction head of the optical pickup device 42 is track-jumped by the predicted distance. As the result of this track-jump, the reproduction head is jumped to the first sector $e_1$ for the I-frame in the next group (e), and the I-frame data in the sectors $e_1$–$e_3$ are reproduced.

Thereafter, in a similar way, the distance predictor 45 calculates the distance $x_3$ from the sector $e_1$ to the sector $d_3$ based on the address of the sector $e_1$ and the address of the sector $d_3$ stored in the address storage circuit 44. After the I-frame data recorded in the sectors $a_1$–$e_3$ in the group (e) are reproduced, the optical pickup device 42 is track-jumped by the distance predicted using the distance $x_3$. As a result of this track-jump, the I-frame data in the sectors $f_1$–$f_3$ in the next group (f) are reproduced. By repeatedly performing the above operation, only the I-frame data sets can be successively reproduced.

In the above description, the address of the first sector for the I-frame data in one group and the address of the last sector for the I-frame data in a group adjacent to the one group is used for predicting the distance. Alternatively, addresses of sectors for the I-frame data in groups which are separated from each other by several groups can be used. By appropriately selecting the addresses of sectors stored in the address storage circuit, it is possible to efficiently reproduce the I frames.

Next, another method for successively reproducing only the I-frame data sets in a trick play will be described.

In this method, in the address storage circuit 44, the memory 442 stores the address of the first sector $c_1$ for I-frame in one group (c) and the address of the last sector $a_3$ for I-frame in a group (a) preceding by two groups with respect to the group (c). The address storage circuit 44 outputs the stored addresses to the distance predictor 45.

The distance predictor 45 calculates the distance $x_4$ from the sector $c_1$ to the sector $a_3$ using the address information supplied from the address storage circuit 44 (see FIG. 10). After the I-frame data recorded in the sectors $c_1$–$c_3$ of the group (c) are reproduced, the distance predictor 45 predicts the distance to the first address for the I-frame to be reproduced next, by using the distance $x_4$, and the distance information signal is applied to the control circuit 48. The control circuit 48 controls the optical pickup driving circuit 47, so that the optical pickup device 42 (specifically, the reproduction head of the optical pickup device 42: not shown) is track-jumped by the predicted distance ($X_4$). As a result of this track-jump, the reproduction head is jumped to the first sector $e_1$ for the I-frame in the group (e) which is separated by two groups, and the I-frame data in the sectors $e_1$–$e_3$ are reproduced. As in the above-described case, by repeatedly performing the above operation, only the I-frame data sets can be successively reproduced. In this case, the I-frame data of every other group are reproduced.

As described above, it is possible to predict the distance from the last sector for the I-frame in a specific group to the first sector for the I-frame in a group succeeding by m groups with respect to the specific group, by using the address of the first sector for the I-frame in the specific group and the address of the last sector for the I-frame in a group preceding by m groups with respect to the specific group (herein, m is a natural number). Accordingly, it is possible to reproduce the I-frame data in a group which is separated by some groups.

According to the reproducing apparatus 700 and the reproducing method of this example, the address storage circuit for storing sector addresses of the I-frame data and the distance predictor are provided. Thus, even if the image data recorded on the recording medium includes no additional information, it is possible to reproduced only the I-frame data sets in a trick play. Furthermore, it is possible to select groups in which the I-frame data are to be reproduced, in accordance with the reproduction speed of the trick play.

According to the invention, it is possible to provide an optical information recording and reproducing apparatus and a recording and reproducing method used in the apparatus, in which trick plays such as high-speed forward reproduction and high-speed backward reproduction can be performed by incorporating intra-frame (or intra-field) coded data among the coded image data so that select data can be reproduced and easily decoded by employing a relatively simple procedure. Moreover, it is possible to provide an optical information recording and reproducing apparatus and a recording and reproducing method used in the apparatus, in which the selection of data to be reproduced can be changed in accordance with a desired reproduction speed.

According to the invention, it is possible to provide an optical information recording and reproducing apparatus and a recording and reproducing method used in the apparatus in which image data can be stably and smoothly decoded, even when data of different transfer rates are mixedly recorded on one recording medium.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A recording medium recorded with video information wherein:

the video information includes a plurality of groups of data, each group of data including intra-frame/field coded data, inter-frame/field coded data and additional information indicating a position of data relating to the intra-frame/field coded data included in at least one group of data other than a specified group of data, the intra-frame/field coded data and the interframe/field coded data each being divided into a plurality of respective sectors, each of the divided sectors of the intra-frame/field coded data having a sector address and the additional information is:

(1) located in a respective recording area for each group of data, and (2) inserted into at least one of a first sector of the divided sectors of the intra-frame/field coded data and a sector proximate to the first sector, not all of the divided sectors in the intra-frame/field coded data are included in the specified group of data, that the intra-frame/field coded data can be selectively reproduced in accordance with a plurality of different reproduction speeds.

2. The recording medium according to claim 1, wherein the intra-frame/field coded data is data coded by using either an intra-frame coding method or an intra-field coding method, and the inter-frame/field coded data is data coded by using either an inter-frame coding method or an inter-field coding method.

3. The recording medium according to claim 1, wherein the additional information includes information for identifying the intra-frame/field coded data.

4. The recording medium according to claim 1, wherein the additional information includes an address of the intra-frame/field coded data in a group of data apart from the specified group of data by m groups, where m is an integer.

5. The recording medium according to claim 1, wherein the additional information includes a distance between the intra-frame/field coded data included in the specified group of data and the intra-frame/field coded data included in a group of data apart from the specified group of data by m groups, where m is an integer.

6. An information reproducing apparatus for reproducing video information recorded in the recording medium according to claim 1, the apparatus comprising:

a pickup for reading the video information from the recording medium;

a reproducing circuit for receiving the video information from the pickup, and for converting the video information into a reproduced signal;

an extractor for receiving the reproduced signal, and for extracting an additional information signal indicating the additional information from the reproduced signal;

a control circuit for receiving the additional information signal, and for controlling a movement of the pickup based on the additional information signal; and a decoder for receiving the reproduced signal, and for decoding the reproduced signal so as to generate an output signal.

7. The information reproducing apparatus according to claim 6, wherein the control circuit calculates a distance between the intra-frame/field coded data included in the specified group of data and the intra-frame/field coded data included in a group of data apart from the specified group of data by m groups based on the additional information signal, and moves the pickup by a distance less than the calculated distance, where m is an integer.

8. A method for reproducing video information recorded in the recording medium according to claim 1, the method comprising the steps of:

reading the video information from the recording medium by a pickup;

receiving the video information from the pickup, and converting the video information into a reproduced signal;

receiving the reproduced signal, and extracting an additional information signal indicating the additional information from the reproduced signal;

receiving the additional information signal, and controlling a movement of the pickup based on the additional information signal; and receiving the reproduced signal, and decoding the reproduced signal so as to generate an output signal.

9. The method according to claim 8, wherein the control step includes the steps of:

calculating a distance between the intraframe/field coded data included in the specified group of data and the intra-frame/field coded data included in a group of data apart from the specified group of data by m groups based on the additional information signal; and moving the pickup by a distance less than the calculated distance, where m is an integer.

* * * * *

UNITED STATES PATENT AND TRADE MARK OFFICE
CERTIFICATE OF CORRECTION

PATENT NO.   : 5,991,502
DATED        : November 23, 1999
INVENTOR(S)  : Kawakami et al.

It is certified that error appears in the above-identified patent and that said Letters Patent is hereby corrected as shown below:

column 14, line 65, insert --so-- before the word "that".

Signed and Sealed this

Second Day of January, 2001

Attest:

Q. TODD DICKINSON

*Attesting Officer*   *Commissioner of Patents and Trademarks*